(12) United States Patent
Kuo

(10) Patent No.: US 6,398,247 B1
(45) Date of Patent: Jun. 4, 2002

(54) BICYCLE HAVING AN EASILY MOUNTABLE REAR CARRIER

(75) Inventor: Chang-Chung Kuo, Taichung (TW)

(73) Assignee: Giant Manufacturing Co., Ltd., Taichung Hsien (TW)

(*) Notice: Subject to any disclaimer, the term of this patent is extended or adjusted under 35 U.S.C. 154(b) by 46 days.

(21) Appl. No.: 09/703,805

(22) Filed: Nov. 2, 2000

Related U.S. Application Data

(63) Continuation-in-part of application No. 09/298,918, filed on Apr. 26, 1999, now abandoned.

(51) Int. Cl.[7] ................................................. B62J 7/04
(52) U.S. Cl. ..................... 280/288.4; 224/427; 224/453
(58) Field of Search ........................... 280/288.4, 304.5, 280/288.1, 274; 224/453, 412, 419, 425, 427, 430

(56) References Cited

U.S. PATENT DOCUMENTS

| | | | |
|---|---|---|---|
| 535,385 A | * 3/1895 | Martin | |
| 5,386,961 A | 2/1995 | Lu | 248/223.4 |
| 5,649,657 A | 7/1997 | Chuang | 224/430 |
| 5,860,577 A | * 1/1999 | Dunn | |
| 5,931,361 A | 8/1999 | Schwimmer | 224/453 |

* cited by examiner

Primary Examiner—Kevin Hurley
(74) Attorney, Agent, or Firm—Foley & Lardner

(57) ABSTRACT

A bicycle includes a frame which has a seat tube, a crossbar, and a tubular connection part connected to and projecting upward from a rear end of the crossbar and sleeved around the seat tube. The tubular connection part has an integral first engagement block. A rack support rod has a front end face extending in a plane transverse to the rack support rod, a rear support portion to support a rack, and a second engagement block connected integrally to the front end face. A mortise-tenon engagement unit is formed in the first and second engagement blocks so as to releaseably interlock the first and second engagement blocks. The second engagement block is slidable relative to the first engagement block along a direction substantially parallel to the plane of the front end face.

3 Claims, 9 Drawing Sheets

BICYCLE HAVING AN EASILY MOUNTABLE REAR CARRIER

CROSS-REFERENCE TO RELATED APPLICATION

This application is a continuation-in-part application of U.S. patent application Ser. No. 09/298,918 filed on Apr. 26, 1999, abandoned.

BACKGROUND OF THE INVENTION

1. Field of the Invention

The invention relates to a bicycle, more particularly to a bicycle frame having attachment means for quickly and easily mounting a rear carrier on a seat tube.

2. Description of the Related Art

For mounting a carrier rack on a bicycle frame, various forms of attachment devices have been suggested in the art. Some of them are available for mounting a front carrier to the bicycle frame above a front wheel, while others are used to attach a rear carrier to the bicycle frame above a rear wheel. FIG. 1 shows a conventional carrier rack 1' which is supported on an axle of a rear wheel 3' via upwardly extending frame members 11' while being also attached, via a screw connection 5' to a bicycle frame close to a location where a seat tube 2' and a crossbar 4' are joined together. Assembly of the carrier rack 1' involves a time-consuming task.

U.S. Pat. No. 5,649,657 discloses a carrier assembly including a tubular support member to carry a carrier rack. The tubular support member has a front end incorporating a C-shaped clamp and clamping screws which lock the clamp tightly against a seat post above the juncture of a seat tube and a crossbar of a bicycle frame. This carrier assembly requires a screwing operation for attachment of the carrier rack to the bicycle frame.

U.S. Pat. No. 5,931,361 discloses a rear carrier mountable quickly and easily on a bicycle via a quickly releasable engaging clip which can be operated between clamping and non-clamping positions through a manually operable lever. This engaging clip embraces a seat post at a location above a connection between the seat post and a crossbar, where accidental downward sliding of the engaging clip member is possible if the clip member is not sufficiently tightened.

It is known to use mortise and tenon engagement components for attachment of accessory parts to a bicycle. U.S. Pat. No. 535,385 discloses a front carrier mounted on a front post of a bicycle frame. The carrier has an attachment plate with a tenon-like projection, whereas the front post is embraced by a collar or clip band which has a pair of projecting jaws defining a mortise groove therebetween for engagement with the attachment plate of the carrier. In that arrangement, the carrier is attached to the front post by clamping the collar or clip band tightly against the front post with a clamping screw and by subsequently engaging the mortise groove with the attachment plate of the carrier. U.S. Pat. No. 5,386,961 discloses a mounting unit attached to a seat post of a bicycle frame for mounting a bicycle lock on the frame. The mounting unit includes a C-shaped clamp member to embrace tightly the seat tube by means of screws. A tubular member for holding the bicycle lock is interlockable with the clamp member by means of a mortise-tenon engagement unit.

As mentioned above, the mortise-tenon engagement parts as suggested in the prior arts are designed to mount accessories other than a rear carrier. Although those mortise-tenon engagement parts can provide an advantage of quickly and easily assembling component parts, they have to cooperate with an embracing member to sleeve around a seat or front tube and a clamp mechanism to clamp tightly the embracing member against the tube. Downward sliding of the embracing member due to heavy load may occur in case of insufficient tightening action of the clamping mechanism. It is desirable that such mortise-and-tenon engagement parts can be used to mount a rear carrier on a bicycle frame without using a clamp mechanism.

SUMMARY OF THE INVENTION

An object of the present invention is to provide a bicycle frame with a rear carrier assembly which can be mounted on the bicycle frame in a quick and easy manner with the least possible number of mounting components for assembly.

Another object of the present invention is to provide a bicycle frame having a first engagement part integrally connected to a structural connection part between a seat post and a crossbar without using a clamp mechanism, and a second engagement part interlockable with the first engagement part and connected integrally to a rack.

A further object of the present invention is to provide a bicycle frame with a rear carrier which has a rack support rod connected integrally to a mortise or tenon engagement part for quick mounting of the carrier to the bicycle frame.

According to the present invention, a bicycle comprises: a frame including a seat tube, a crossbar extending forwardly of the seat tube, and a tubular connection part connected to and projecting upward from a rear end of the crossbar and sleeved around the seat tube, the seat tube extending upward from the tubular connection part, the tubular connection part having an integral first engagement block projecting rearwardly therefrom; a rack support rod having a front end with a front end face extending in a plane transverse to the rack support rod, a rear support portion extending rearwardly of the front end, and a second engagement block connected integrally to the front end, the second engagement block having a rear connecting face abutting with and connected integrally to the front end face, and an opposite front engagement face to interlock with the first engagement block, the rear connecting face and the front engagement face extending along a direction substantially parallel to the plane of the front end face; a rack member disposed above and fixed to the rear support portion; and mortise-tenon engagement means formed in the first engagement block and the front engagement face for releaseably interlocking the first and second engagement blocks, the mortise-tenon engagement means including a mortise member formed in one of the first engagement block and the front engagement face, and a tenon formed on the other one of the first engagement block and the front engagement face, the second engagement block being slidable relative to the first engagement block along a line substantially parallel to the plane of the front end face.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
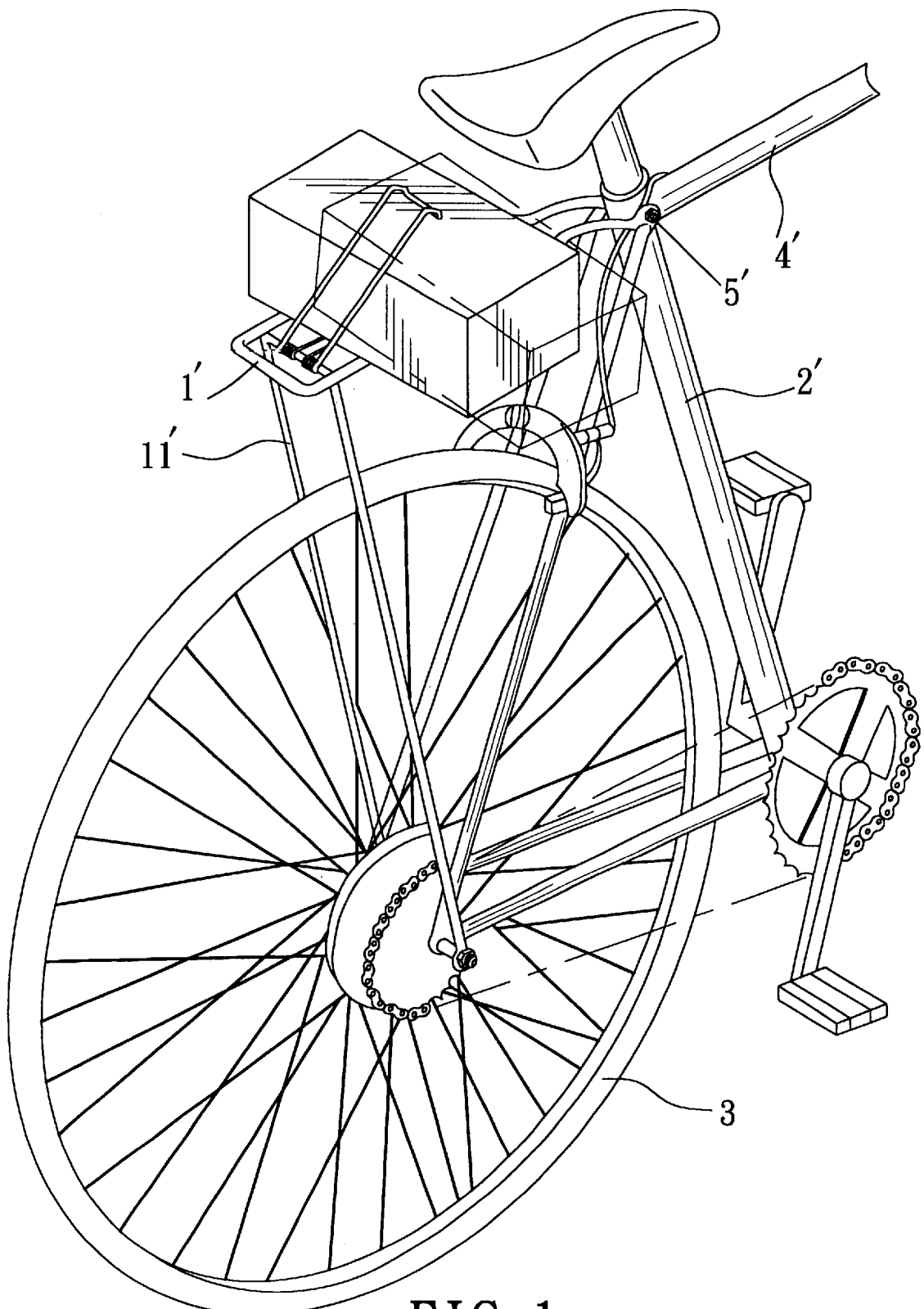
FIG. 1 shows a conventional rear carrier of a bicycle.
Figure 2:
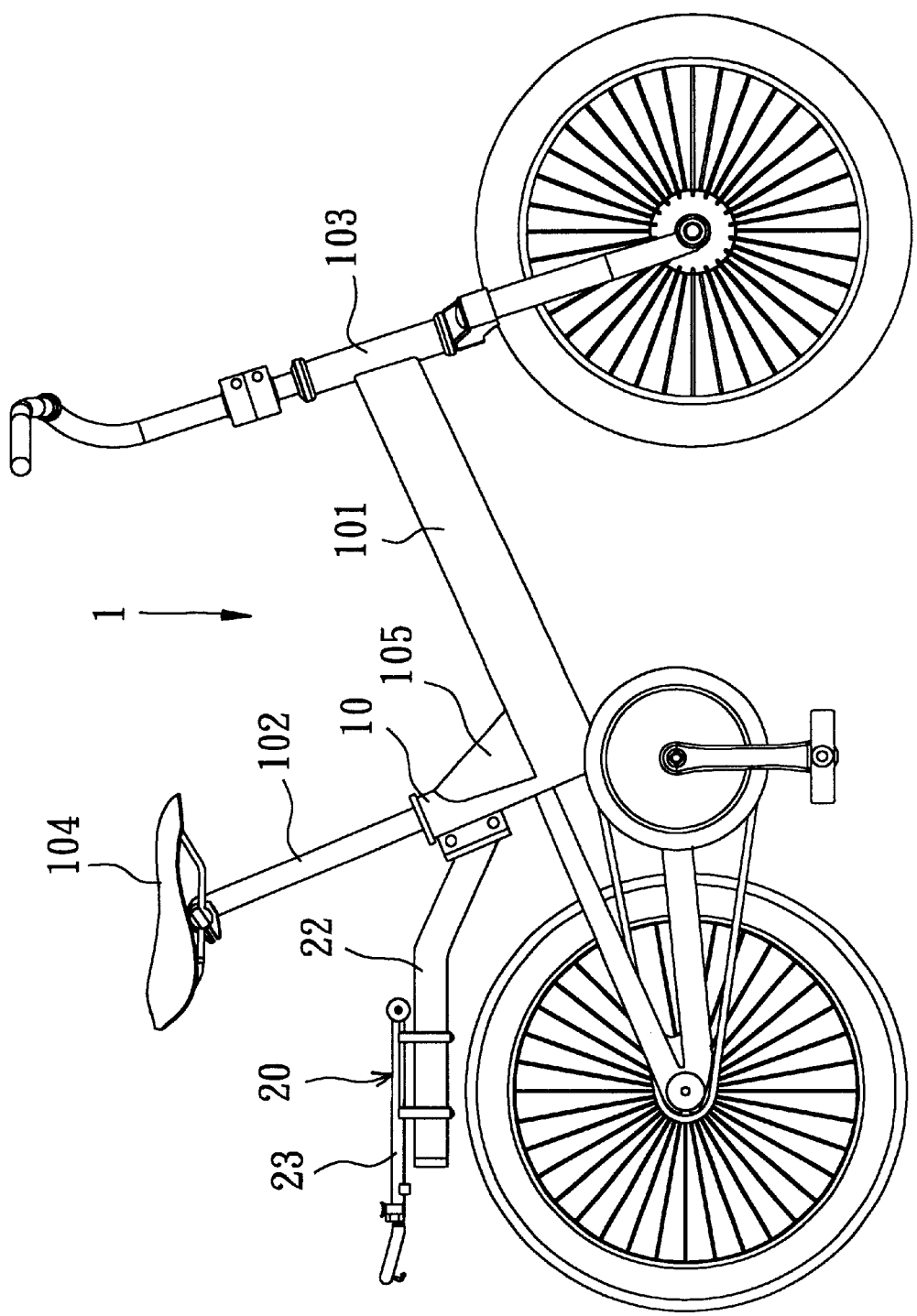
FIG. 2 is a side plan view of a bicycle incorporating a preferred embodiment of the present invention.
Figure 3:
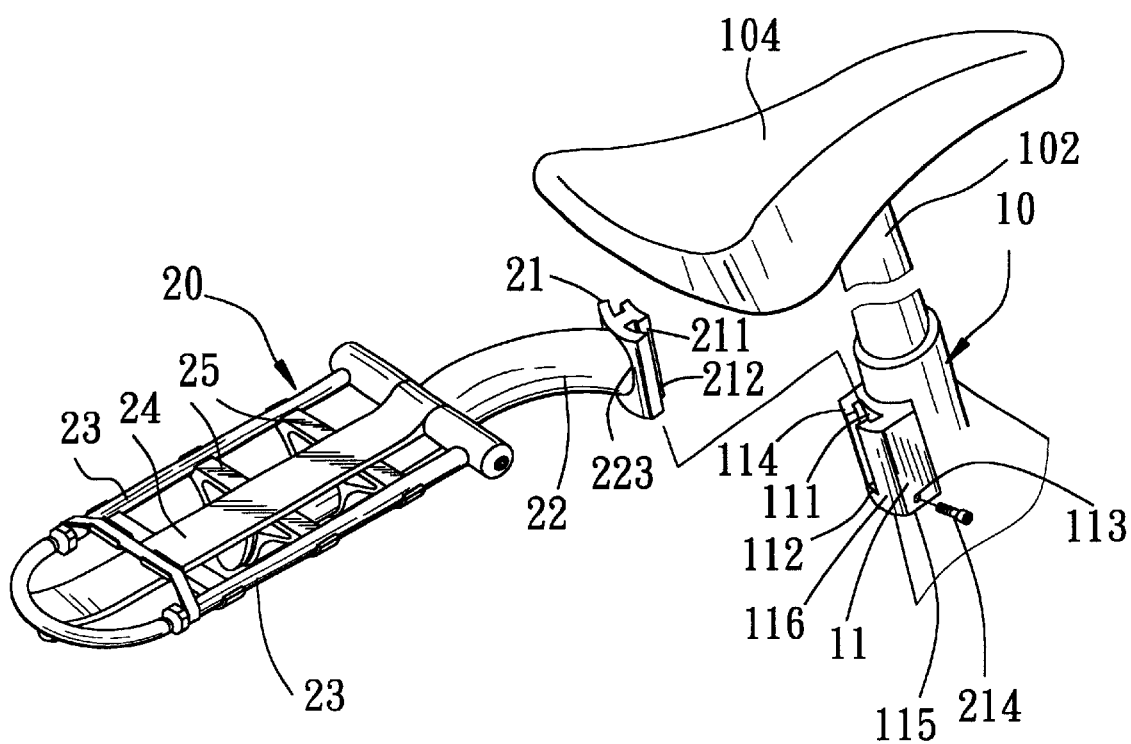
FIG. 3 is a fragmentary perspective view of the embodiment shown in FIG. 2.

Referring to FIGS. 2 and 3, a bicycle 1 embodying the present invention is shown to include a crossbar 101 having a front end connected to a front post 103, and a seat tube 102 supporting a seat 104. The crossbar 101 has a tubular connection part 10 which projects upward from a rear end of the crossbar 101 and is sleeved around the seat tube 102. The seat tube 102 extends upward from the tubular connection part 10. The tubular connection part 10 has a reinforcement part 105 which projects forwardly from a front side of the wall of the tubular connection part 10 and which is tapered upward. A first engagement block 11 is connected integrally, such as by welding, to a rear side of the wall of the tubular connection part 10 and projects rearwardly. The first engagement block 11 has top and bottom faces 114, 115, and a rear face 116 that interconnects the top and bottom faces 114, 115. A mortise groove 111 is formed in the rear face 116 and extends from the top face 114 toward the bottom face 115 of the block 11. The mortise groove 111 opens at the top face 114 and has a lower end ending at a shoulder face 112 adjacent to the bottom face 115.

Figure 4:
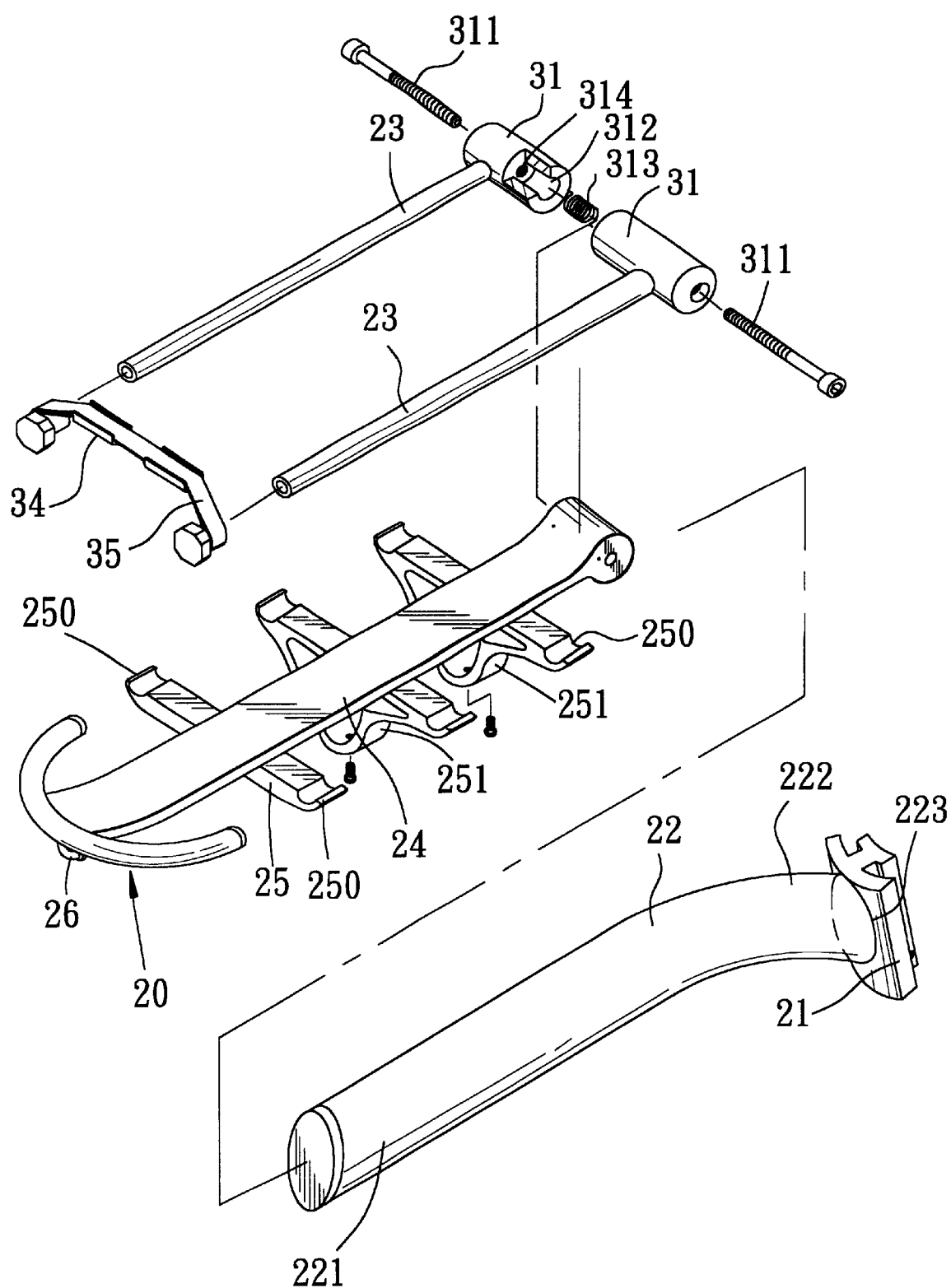
FIG. 4 is an exploded view of a rack of the preferred embodiment.

Referring to FIG. 4 in combination with FIG. 3, the bicycle 1 further includes a rack 20 supported by a rack support rod 22 in the form of a tube. The rack 20 has a main shaft 24 extending along the direction of the rack support rod 22, and three spaced apart ribs 25 which extend transversely of the main shaft 24. A pair of grooves 250 are formed in two opposite ends of each rib 25. Two ring members 251 of substantially oval-shaped cross-section project downward respectively from two ribs 25 and are aligned longitudinally of the main shaft 24. The rack support rod 22, in the form of a tube, has a substantially straight rear support portion 221 which extends through the ring members 251. The rack support rod 22 is inclined downward from the rear rack support portion 221 to a front end 222 which has a ring-shaped front end face 223 extending in a plane transverse to the rack support tube 22.

Figure 5:
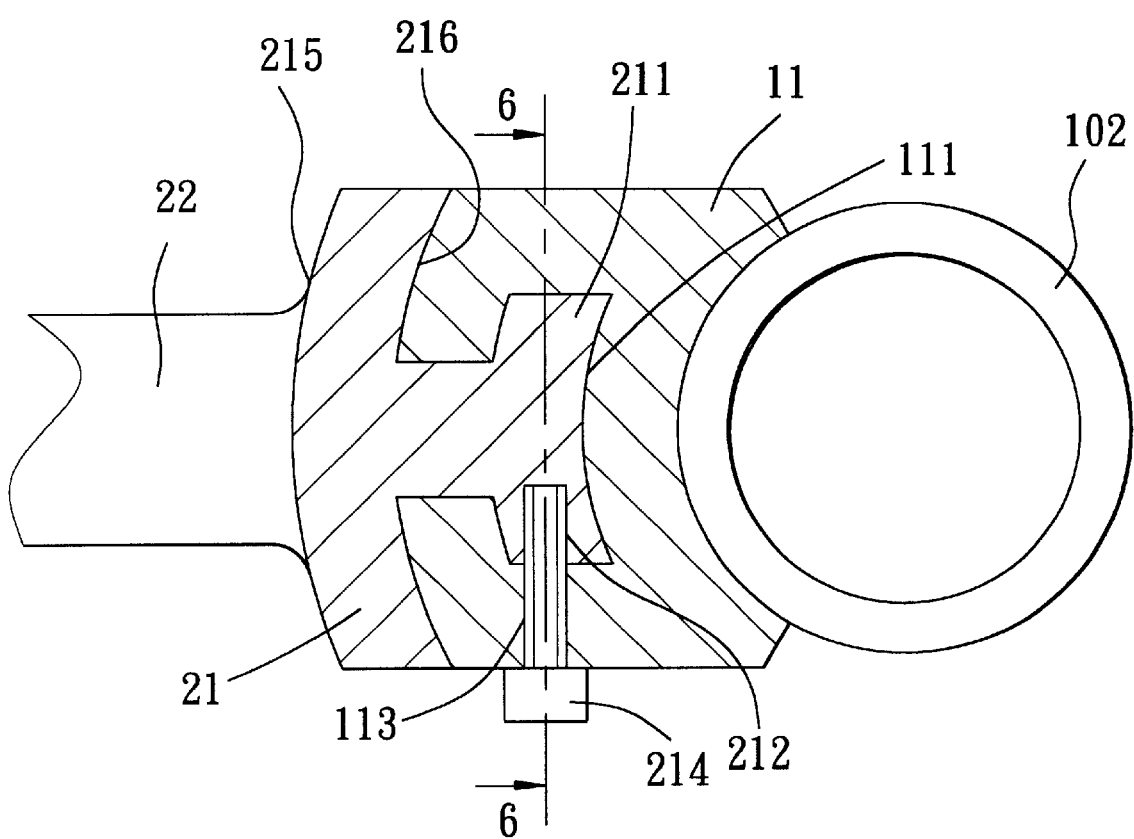
FIG. 5 is a sectional view showing first and second engagement blocks of the preferred embodiment in an interlocked position.
Figure 6:
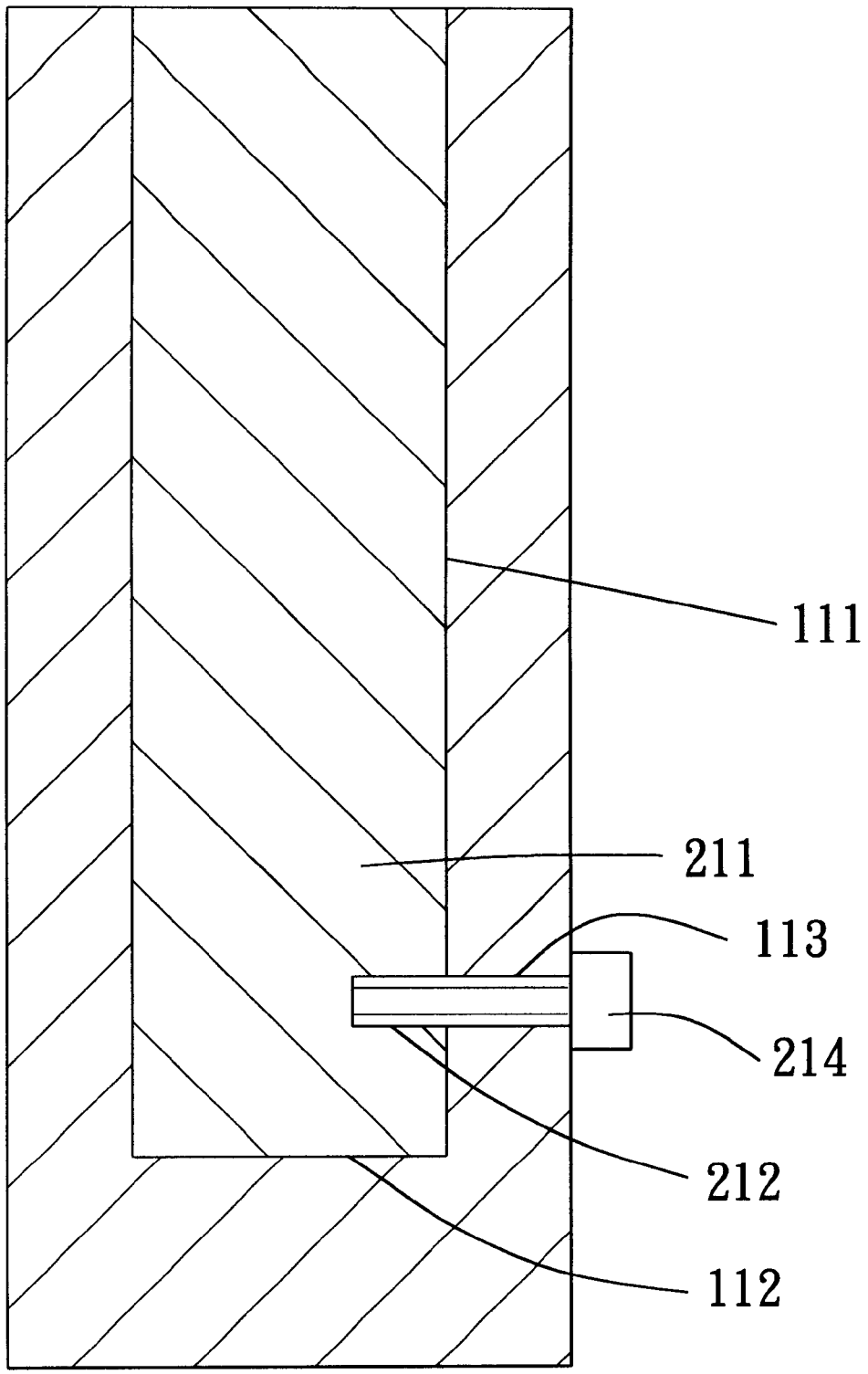
FIG. 6 is a sectional view taken along line 6—6 of FIG. 5.

Referring to FIGS. 5 and 6 in combination with FIG. 3, the front end face 223 of the rack support tube 22 is integrally connected to a rear connecting face 215 of a second engagement block 21. A strong joint between the rack support tube 22 and the second engagement block 21 is thereby achieved. A front engagement face 216 of the second engagement block 21 is formed with a tenon 211 for interlocking with the mortise groove 111 of the first engagement block 11. Both the rear connecting face 215 and the front engagement face 216 extend in a direction substantially parallel to the plane of the front end face 223 of the rack support tube 22. The tenon 211 projects forwardly from the front engagement face 216 and extends along a line substantially parallel to the plane of the front end face 223.

Due to the use of the mortise groove 111 and the tenon 211, the rack 20 can be attached quickly and easily by interlocking the first and second engagement blocks 11, 21.

In addition, as the first engagement block 11 is configured as a unitary structure with the tubular connection part 10, which connects the seat tube 102 to the cross bar 101, via an integral connection, such as a welded connection, no extra mounting component, such as a clamp mechanism, for mounting the first engagement block 11 on the seat tube 102 is needed. After the first and second engagement blocks 11 and 21 are interlocked, a screw member 214 is inserted through a threaded hole 113 formed in the first engagement block 11 and into a threaded hole 212 formed in the tenon 211.

Figure 7:
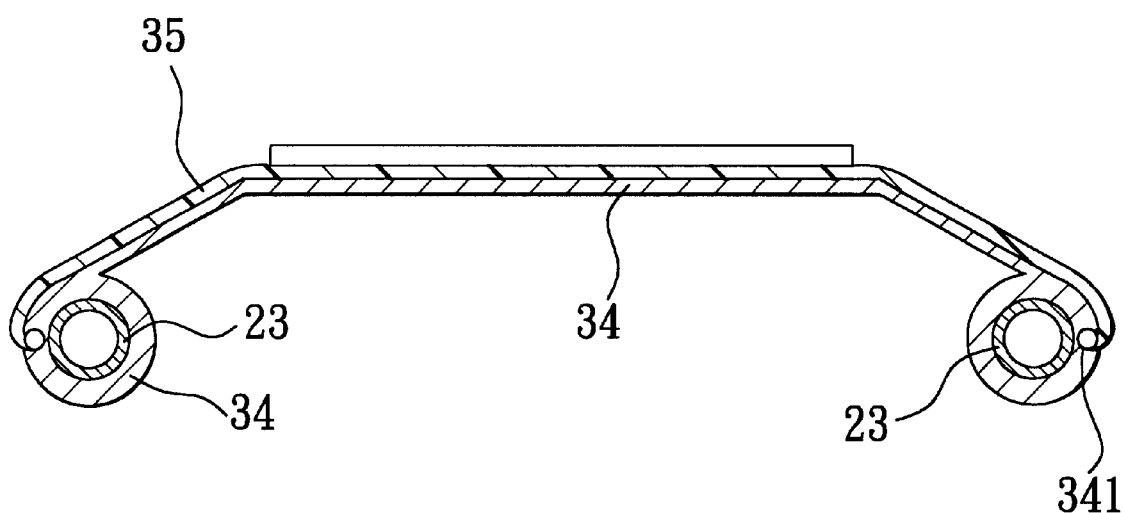
FIG. 7 is a sectional view showing the bridge and the elastic band of the rack.

Referring again to FIG. 4, the rack 20 further includes a pair of clamp rods 23 extending longitudinally on two sides of the main shaft 24 to be received in the grooves 250 of the ribs 25. Each clamp rod 23 has an integral front sleeve 31 pivotally connected to a front end of the main shaft 24 by means of a pivot pin 311. Each sleeve 31 has a blind hole 312 receiving a torsion spring 313 fixed in the hole 312 at 314 to bias the corresponding clamp rod 23 toward the ribs 25. A rigid bridge member 34 is disposed between and connected to the rear ends of the clamp rods 23 so as to space apart the clamp rods 23. An elastic band 35 has two ends connected to two slits 341 formed in two opposite ends of the bridge member 34 as best shown in FIG. 7. A hook is disposed at the rear end of the main shaft 24.

Figure 8:
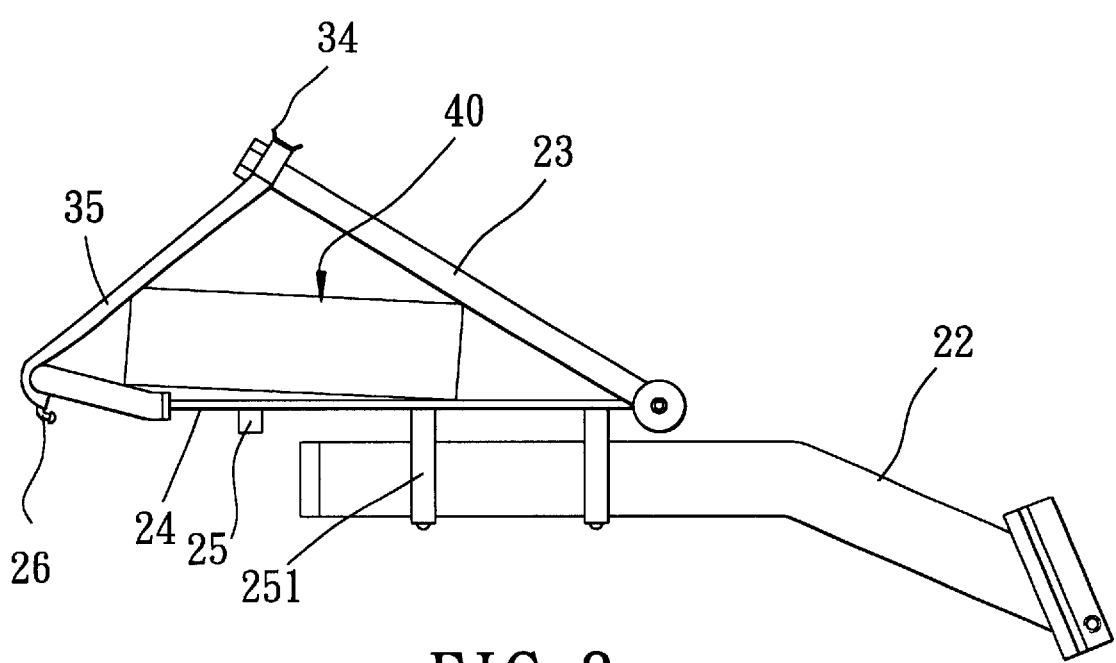
FIG. 8 is a plan view of the rack of the preferred embodiment in use.
Figure 9:
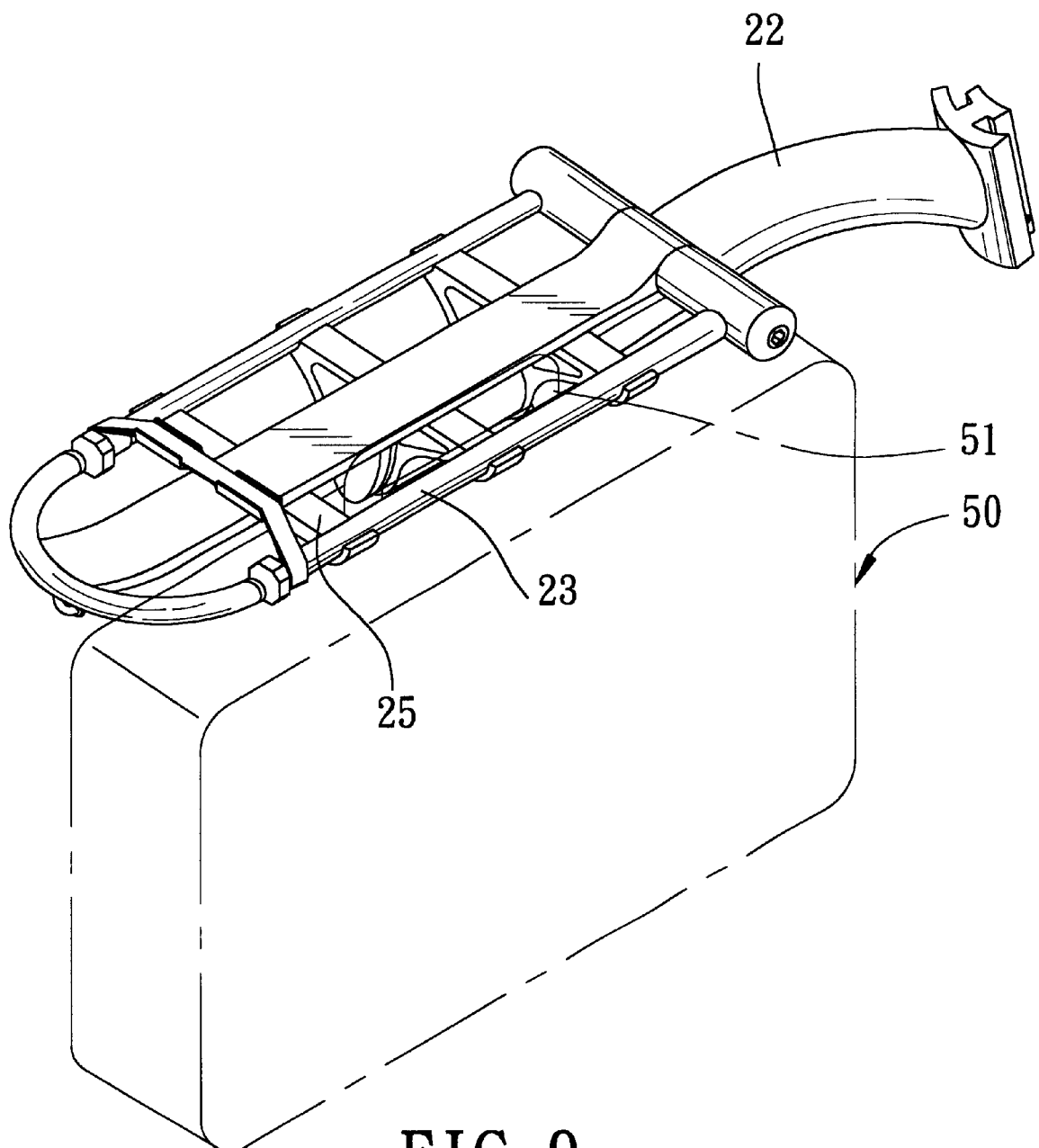
FIG. 9 is another plan view of the rack of the preferred embodiment in use.

Referring to FIG. 8, an article 40 is placed on the rack 20 between the main shaft 24 and the clamp rods 23. The elastic band 35 is pulled away from the bridge member 34 and is placed in engagement with the hook 26 at the rear end of the main shaft 24 so as to provide a clamping force for clamping the article 40 on the rack 20. Referring to FIG. 9, the rack 20 can carry a brief case 50 by hanging a handle 51 of the brief case 50 on one end of the ribs 25. The clamp rods 23 biased to abut with the ribs 25 at the grooves 250 will prevent the handle 51 from being released from the rack 20.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle comprising:
    a frame including a seat tube, a crossbar extending forwardly of said seat tube, and a tubular connection part connected to and projecting upward from a rear end of said crossbar and sleeved around said seat tube, said seat tube extending upward from said tubular connection part, said tubular connection part having an integral first engagement block projecting rearwardly therefrom;
    a rack support rod having a front end with a front end face extending in a plane transverse to said rack support rod, a rear support portion extending rearwardly of said front end, and a second engagement block connected integrally to said front end, said second engagement block having a rear connecting face abutting with and connected integrally to said front end face, and an opposite front engagement face to interlock with said first engagement block, said rear connecting face and said front engagement face extending along a direction substantially parallel to said plane of said front end face;

a rack member disposed above and fixed to said rear support portion; and mortise-tenon engagement means formed in said first engagement block and said front engagement face for releaseably interlocking said first and second engagement blocks, said mortise-tenon engagement means including a mortise member formed in one of said first engagement block and said front engagement face, and a tenon formed on the other one of said first engagement block and said front engagement face, said second engagement block being slidable relative to said first engagement block along a line substantially parallel to said plane of said front end face.

2. The bicycle frame as claimed in claim 1, wherein said rack support rod is a tube which is substantially straight in said rear support portion and is inclined downward from said rear support portion to extend to said front end, said front end face having a substantially ring-shape.

3. The bicycle frame as claimed in claim 1, wherein said front engagement face has a tenon projecting forward therefrom and extending along a direction substantially parallel to said plane of said front end face, said first engagement block being formed with a mortise groove to interlock with said tenon.

* * * * *